(12) United States Patent
Furuta et al.

(10) Patent No.: US 11,282,481 B2
(45) Date of Patent: Mar. 22, 2022

(54) INFORMATION PROCESSING DEVICE

(71) Applicant: NTT DOCOMO, INC., Chiyoda-ku (JP)

(72) Inventors: Takayuki Furuta, Chiyoda-ku (JP); Yuuta Higuchi, Chiyoda-ku (JP); Kazuki Higashi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/957,581

(22) PCT Filed: Nov. 30, 2018

(86) PCT No.: PCT/JP2018/044297
§ 371 (c)(1),
(2) Date: Jun. 24, 2020

(87) PCT Pub. No.: WO2019/130992
PCT Pub. Date: Jul. 4, 2019

(65) Prior Publication Data
US 2020/0335065 A1 Oct. 22, 2020

(30) Foreign Application Priority Data
Dec. 26, 2017 (JP) .............................. JP2017-249037

(51) Int. Cl.
*G09G 5/37* (2006.01)
(52) U.S. Cl.
CPC ........... *G09G 5/37* (2013.01); *G09G 2354/00* (2013.01)
(58) Field of Classification Search
None
See application file for complete search history.

(56) References Cited

U.S. PATENT DOCUMENTS 6,078,329 A 6/2000 Umeki et al.
2018/0322681 A1* 11/2018 Inomata ................ A63F 13/211
(Continued)

FOREIGN PATENT DOCUMENTS

| JP | 9-153146 A | 6/1997 |
| JP | 2017-55851 A | 3/2017 |

OTHER PUBLICATIONS

International Search Report dated Feb. 19, 2019 in PCT/JP2018/044297 filed on Nov. 30, 2018 citing document AA and AP therein, 1 page.

(Continued)

*Primary Examiner* — Yi Wang
(74) *Attorney, Agent, or Firm* — Oblon, McClelland, Maier & Neustadt, L.L.P.

(57) ABSTRACT

An information processing device according to one embodiment is an information processing device controlling a motion of a user object in a virtual space that is associated with a user wearing an HMD, the information processing device including: a motion information acquiring unit that acquires motion information of the head and eyes of the user detected in an actual space; a provisional line-of-sight determining unit that determines a provisional line-of-sight of the user object on the basis of the motion information; a line-of-sight control unit that controls a line-of-sight of the user object on the basis of a positional relation between the provisional line-of-sight and one or more objects in the virtual space; and an image generating unit that generates an image which the line-of-sight of the user object controlled by the line-of-sight control unit is reflected in and are displayed on the HMD.

7 Claims, 9 Drawing Sheets

(56) References Cited

U.S. PATENT DOCUMENTS

| | | |
|---|---|---|
| 2018/0373413 A1* | 12/2018 | Sawaki ................ H04N 13/332 |
| 2019/0043245 A1* | 2/2019 | Ogata .................... H04N 7/141 |
| 2019/0279070 A1* | 9/2019 | Hayashi .................... B25J 5/00 |
| 2020/0152191 A1* | 5/2020 | Touyama ................ G10L 25/84 |

OTHER PUBLICATIONS

English translation of the International Preliminary Report on Patentability and Written Opinion of the International Searching Authority dated Jul. 9, 2020 in PCT/JP2018/044297, 11 pages.

Office Action dated Jun. 29, 2021 in corresponding Japanese Patent Application No. 2019-562896 (with English Translation), 6 pages.

* cited by examiner

INFORMATION PROCESSING DEVICE

TECHNICAL FIELD

One aspect of the present invention relates to an information processing device.

BACKGROUND ART

Conventionally, a technology called virtual reality (VR) that allows a user to be immersed in a virtual space by providing the user on whom a head mounted display (HMD) or the like is mounted with a view as if the user were present in the virtual space is known. In such a VR technology, for example, a user object (an avatar, a character, or the like) associated with a user's motion (for example, an motion of a part of the body such as the head, hands, or the like) is generated in a virtual space and is controlled in accordance with a user's motion. Then, by displaying an image representing the view of the user object on the HMD, the user is provided with an experience as if he or she were present as the user object in the virtual space.

For example, in Patent Document 1, in order to promote communication between users in a virtual space (communication through user objects), a technique for associating a motion of a user's actual head or eyes with a motion of a head or eyes of a user object in the virtual space has been disclosed.

CITATION LIST

Patent Literature

[Patent Document 1] Japanese Unexamined Patent Publication No. 2017-55851

SUMMARY OF INVENTION

Technical Problem

However, it is not necessarily desirable to directly reflect a user's actual motion (a motion of the head or eyes) on a user object as in the technique described above for achieving smooth communication between users in the virtual space. For example, there are cases in which a detection error occurs in the motion of a user's head or eyes detected using a sensor or the like. In such a case, according to the technique described above, a deviation between a user's actual motion (a face direction, a line-of-sight, and the like) and a motion of a user object occurs.

Thus, an object of one aspect of the present invention is to provide an information processing device capable of further smoothing communication between users in a virtual space.

Solution to Problem

According to one aspect of the present invention, there is provided an information processing device that controls a motion of a user object that is associated with a user wearing a display device in a virtual space, the information processing device including: a motion information acquiring unit that acquires motion information of the head and eyes of the user detected in an actual space; a provisional line-of-sight determining unit that determines a provisional line-of-sight of the user object on the basis of the motion information; a line-of-sight control unit that controls a line-of-sight of the user object on the basis of a positional relation between the provisional line-of-sight and one or more objects in the virtual space; and an image generating unit that generates an image in which the line-of-sight of the user object controlled by the line-of-sight control unit is reflected and displayed on the display device.

According to the information processing device according to one aspect of the present invention, a provisional line-of-sight of the user object is determined once on the basis of the motion information of the head and the eyes of the user that have been actually detected. Then, an image displayed in the display device is generated by controlling a line-of-sight of the user object on the basis of a positional relation between the provisional line-of-sight and one or more objects in the virtual space. According to such a process, the line-of-sight of the user object controlled to be directed in a more natural direction than that in a case in which the line-of-sight (motion information) of the user that has been actually detected is applied to the line-of-sight of the user object as it is can be presented to users. As a result, communication among users in the virtual space through the user object can be performed more smoothly.

Advantageous Effects of Invention

According to one aspect of the present invention, an information processing device capable of further smoothing communication between users in a virtual space can be provided.

DESCRIPTION OF EMBODIMENTS

Hereinafter, one embodiment of the present invention will be described in detail with reference to the drawings. In description of the drawings, the same reference signs will be assigned to the same elements or elements corresponding to each other, and duplicate description will be omitted.

Figure 1:
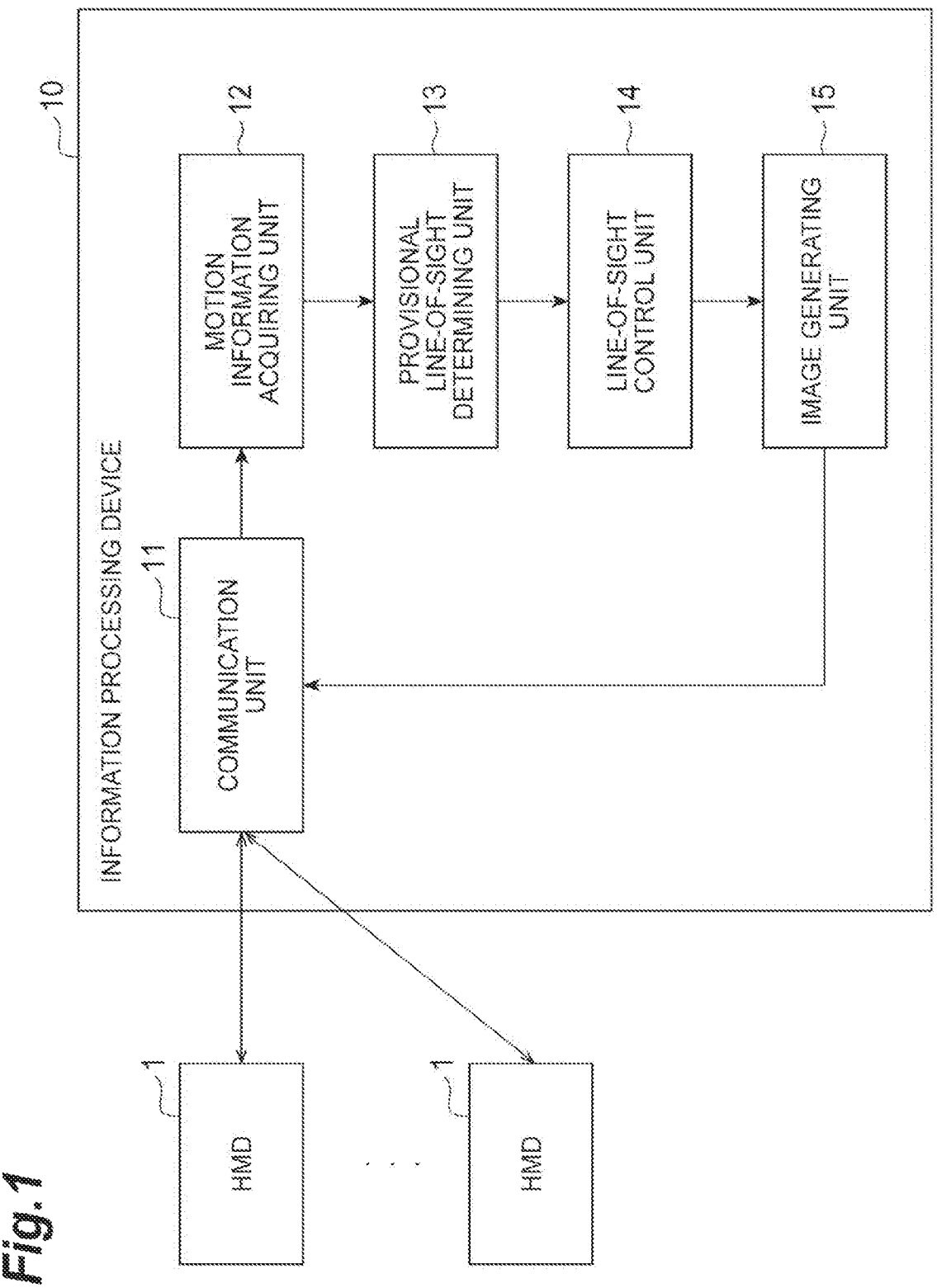
FIG. 1 is a diagram illustrating the functional configuration of an information processing device according to one embodiment.

FIG. 1 is a diagram illustrating the functional configuration of an information processing device 10 according to one embodiment of the present invention. The information processing device 10 is a device that provides users with virtual spaces in which arbitrary VR content such as a game space, a chatting space, and the like is expanded through head mounted displays (HMDs) 1 (display devices) worn by the users. The information processing device 10 controls a motion (particularly, a line-of-sight) of a user object in the virtual space.

In this embodiment, a case in which a plurality of user objects (avatars, characters, or the like) operated by a plurality of users are present in the same virtual space will be described. In this case, a line-of-sight of each user object controlled by the information processing device 10 is reflected in an image (video) displayed on an HMD 1 worn by each user. As a result, each user can perceive lines of sights of other users on the basis of lines of sights of user objects (for example, a line-of-sight of each user object represented by a direction of a head, positions of eyes, and the like of the user object) displayed on the HMDs 1. Here, the process of the information processing device 10 to be described later is also applied to a case in which only a user object of one user is present in the same virtual space. In such a case, a line-of-sight of a user object controlled by the information processing device 10, for example, is reflected in a video acquired by capturing and recording the user object in the virtual space from a third party's point of view and the like.

As illustrated in FIG. 1, the information processing device 10 includes a communication unit 11, a motion information acquiring unit 12, a provisional line-of-sight determining unit 13, a line-of-sight control unit 14, and an image generating unit 15. The information processing device 10, for example, is a game terminal, a personal computer, a tablet terminal, or the like that can communicate with a plurality of HMDs 1 worn by a plurality of users. However, a mounting form of the information processing device 10 is not limited to a specific form. For example, the information processing device 10 may be a computer device built in the same device as the HMD 1. In addition, the information processing device 10 may be a server apparatus or the like that can communicate with HMDs 1 of a plurality of users (computer terminals controlling the motions of HMDs 1) through communication lines such as the Internet. Furthermore, the information processing device 10 may be physically configured either by a single device or by a plurality of devices. For example, the information processing device 10 may be configured as a distributed system in which some functions (for example, the function of the image generating unit 15) are realized by a computer terminal controlling the motion of each HMD 1, and other functions are realized by a server apparatus that can communicate with the computer terminal.

The HMD 1 is a display device that is worn on a user's body (for example, the head). The HMD 1 includes a display unit that displays images (a left-eye image and a right-eye image) in front of the eyes of a user, for example, in a state in which it is worn on the head of the user. By displaying mutually different images (videos) as the left-eye image and the right-eye image, a stereoscopic image (three-dimensional image) is recognized by the user. In addition, the display unit described above may be a display that is configured integrally with a main body unit worn on a user's body such as a glasses type, a helmet type, or the like, or a device that can be detachably attached to the main body unit of the HMD 1 (for example, a display of a terminal such as a smartphone or the like mounted in the main body unit) may function as the display unit described above.

The HMD 1, for example, includes sensors (for example, an acceleration sensor, an angular velocity sensor, a geomagnetic sensor, a gyro sensor, and the like) that can detect a position, a direction (inclination), a speed, an acceleration, and the like of the head of the user (in other words, the HMD 1). The HMD 1 regularly transmits information (a position, a direction, a speed, an acceleration, and the like) of a motion of the head of the user detected by such sensors to the information processing device 10 as motion information of the head of the user.

In addition, the HMD 1, for example, includes a sensor such as an infrared camera or the like detecting a motion of the eyes of the user (for example, the position, the motion, and the like of the irises). The sensor, for example, is a sensor that has a known eye tracking function. The sensor, for example, detects a motion of each eyeball by receiving reflected light of infrared light emitted to the right eye and the left eye of the user from a cornea or the like. The HMD 1 regularly transmits motion information of the eyes of the user detected as described above to the information processing device 10.

In addition, the HMD 1 includes a microphone (not illustrated in the drawing) used for inputting a voice of a user wearing the HMD 1 and a speaker (not illustrated in the drawing) outputting a voice of each user and the like as components thereof. The voice acquired by the microphone is transmitted to the information processing device 10. In addition, the speaker outputs voices of other users and the like received from the information processing device 10. By using the microphone and the speaker, conversation (chatting) can be performed between a plurality of users. In addition, the microphone and the speaker may be devices of an HMD 1 integration-type or may be devices different from the HMD 1.

The communication unit 11 transmits/receives data to/from an external device such as the HMD 1 (including a microphone, a speaker, a controller, and the like that are components of the HMD 1) through a wired or wireless communication network. In this embodiment, the communication unit 11 receives motion information of the head and the eyes of the user acquired by the HMD 1 as described above from the HMD 1. In addition, the communication unit 11 transmits an image generated by the image generating unit 15 to be described later to the HMD 1. According to this process, an image of a virtual space in which a line-of-sight of a user object controlled by the line-of-sight control unit 14 to be described later is reflected is displayed in the HMD 1. Furthermore, the communication unit 11 receives a voice of each user input to the microphone described above and transmits the received voice of each user to the speaker of each user. According to such a process, voices are shared among users, and the chatting described above is realized.

The motion information acquiring unit 12 acquires motion information of the head and the eyes of a user detected in an actual space. In this embodiment, the motion information acquiring unit 12 acquires the motion information of the head and the eyes of each user received by the communication unit 11 from each HMD 1.

The provisional line-of-sight determining unit 13 determines a provisional line-of-sight of a user object associated with the user on the basis of the motion information of the user acquired by the motion information acquiring unit 12. The user object, for example, is a character, an avatar, or the like operated by the user. For example, the provisional line-of-sight determining unit 13 determines a provisional line-of-sight of a user object in a virtual space by associating the motion information of the head and the eyes of the user as motions of the head and the eyes of the user object in the virtual space. The provisional line-of-sight of the user object, for example, is information including at least one of the direction of a line-of-sight (visual axis) and a visual point (gazing point). In addition, the process of the provisional line-of-sight determining unit 13 is performed for each of a plurality of users. As a result, a provisional line-of-sight of each user object associated with each user is determined.

The line-of-sight control unit 14 controls the line-of-sight of a user object on the basis of a positional relation between the provisional line-of-sight of the user object determined by the provisional line-of-sight determining unit 13 and one or more objects in the virtual space. The process of the line-of-sight control unit 14, similar to the process of the provisional line-of-sight determining unit 13, is executed for each user (for each user object).

For example, the line-of-sight control unit 14 calculates an index value representing a distance between the provisional line-of-sight and an object in the virtual space and compares the index value with a predetermined threshold. The predetermined threshold, for example, is a value that is set in the information processing device 10 in advance. The predetermined threshold may be a fixed value or a variable value that can change in accordance with a motion of a user or the like. The line-of-sight control unit 14 determines whether or not a candidate object that is an object of which the index value is equal to or smaller than the threshold is present, and in a case in which a candidate object is present, controls the line-of-sight of the user object such that it is directed toward the candidate object.

Figure 2:
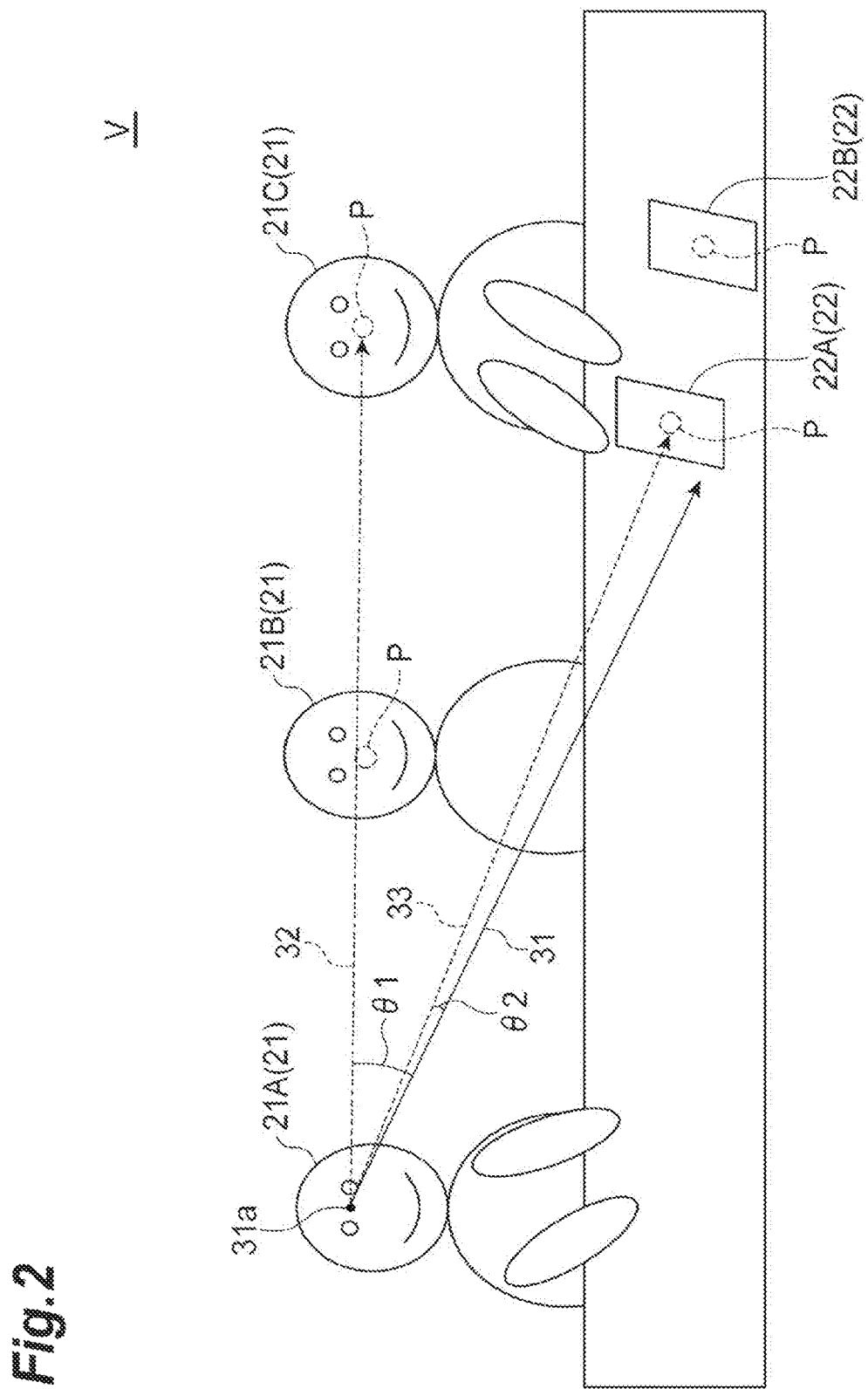
FIG. 2 is a diagram schematically illustrating one example of a virtual space.

FIG. 2 is a diagram schematically illustrating one example of a virtual space V including user objects 21 (21A to 21C) associated with a plurality of (here, three) users. Here, the process of the line-of-sight control unit 14 described above will be described by focusing on a case in which the line-of-sight of the user object 21A is controlled.

The example illustrated in FIG. 2 illustrates a situation in which three user objects 21 sit in front of the same long desk and have a conversation. Two material objects 22 (22A and 22B) representing objects (here, card-shaped objects) other than a user object 21 are placed on the long desk. Here, as an example, a provisional line-of-sight 31 representing the direction of the line-of-sight (visual axis) of the user object 21A is directed toward a position in front of the material object 22A on the long desk. As an example, a start point 31a of the provisional line-of-sight 31 is set as a midpoint between the two eyes of the user object 21A. In addition, a candidate point P representing a position that is a candidate directed toward the line-of-sight of the user object 21A is set in each object (each of the user objects 21B and 21C and the material objects 22A and 22B). In addition, a plurality of candidate points P corresponding to a plurality of parts (for example, body parts such as a face, a body, an arm, and the like of the user object 21) set in the object may be set in one object. In this embodiment, in the user object 21, a candidate point P is set in a portion corresponding to the face of the user object 21. In the material object 22, a candidate point P is set at a center position of the material object 22.

In this case, for example, the line-of-sight control unit 14 calculates an angle $\theta 1$ formed by a virtual line-of-sight 32 from the start point 31a of the provisional line-of-sight 31 to the candidate point P of the user object 21 and the provisional line-of-sight 31 as an index representing a distance between the provisional line-of-sight 31 and a user object 21 (here, the user object 21C is one example). For example, the line-of-sight control unit 14 calculates an angle $\theta 1_h$ (in other words, a horizontal component of the angle $\theta 1$) formed by the virtual line-of-sight 33 and the provisional line-of-sight 31 in a horizontal direction in the virtual space V and an angle $\theta 1_v$ (in other words, a vertical component of the angle $\theta 1$) formed by the virtual line-of-sight 32 and the provisional line-of-sight 31 in a vertical direction (a perpendicular direction) in the virtual space V and calculates an angle $\theta 1$ on the basis of the angle $\theta 1_h$ and the angle $\theta 1_v$. Similarly, the line-of-sight control unit 14 calculates an angle $\theta 2$ formed by a virtual line-of-sight 33 from the start point 31a of the provisional line-of-sight 31 to the candidate point P of a material object 22 and the provisional line-of-sight 31 as an index representing a distance between the provisional line-of-sight 31 and the material object 22 (here, the material object 22A is one example). For example, the line-of-sight control unit 14 calculates an angle $\theta 2_h$ (in other words, a horizontal component of the angle $\theta 2$) formed by the virtual line-of-sight 33 and the provisional line-of-sight 31 in the horizontal direction in the virtual space V and an angle $\theta 2_v$ (in other words, a vertical component of the angle $\theta 2$) formed by the virtual line-of-sight 32 and the provisional line-of-sight 31 in the vertical direction (a perpendicular direction) in the virtual space V and calculates an angle $\theta 2$ on the basis of the angle $\theta 2_h$ and the angle $\theta 2_v$.

Then, the line-of-sight control unit 14 compares such index values (the angles $\theta 1$ and $\theta 2$) with a predetermined threshold Th. Then, the line-of-sight control unit 14 extracts objects of which the angles $\theta 1$ and $\theta 2$ are equal to or smaller than the threshold Th as candidate objects. In the example illustrated in FIG. 2, in a case in which "$\theta 2 < Th < \theta 1$" is satisfied, the material object 22A is extracted as a candidate object, and the user object 21C is not extracted as a candidate object. In a case in which the material object 22A is extracted as a candidate object, the line-of-sight control unit 14 controls the line-of-sight of the user object 21A such that it is directed toward the material object 22A (the candidate point P of the material object 22A). In other words, the line-of-sight control unit 14 causes the line-of-sight of the user object 21A to coincide with the virtual line-of-sight 33.

In a case in which a plurality of candidate objects extracted as described above are present, the line-of-sight control unit 14 selects one candidate object on the basis of at least one of a type and a state of each candidate object and controls the line-of-sight of the user object 21A such that it is directed toward the one candidate object. For example, a priority level based on at least one of the type and the start of an object is set for each object. In a case in which a plurality of candidate objects are present, the line-of-sight control unit 14 determines a candidate object that is a destination toward which the line-of-sight of the user object 21A is directed on the basis of a priority level set for each candidate object. Then, the line-of-sight control unit 14 controls the line-of-sight of the user object 21A such that it is directed toward the candidate object determined as the destination toward which the line-of-sight of the user object 21A is directed.

For example, a priority level higher than that of a material object 22 not moving in the virtual space V (hereinafter, also referred to as a "still object") is set for a material object 22 moving in the virtual space V (hereinafter, also referred to as a "moving object"). Such setting of priority levels is based on an assumption that an object that is active in the virtual space V (a moving object) has a higher likelihood of attracting a user's attention than a still object.

In addition, a priority level higher than that of a non-speaking user object 21 (hereinafter, also referred to as a "non-speaking object") is set for a user object 21 that is speaking (hereinafter, also referred to as a "speaking object"). Such setting of priority levels is based on an assumption that a speaking object has a higher likelihood of attracting a user's attention than a non-speaking object.

For example, the line-of-sight control unit 14 may determines whether or not a user object 21 is a speaking object on the basis of whether or not it is in a state in which a voice having a volume equal to or higher than a predetermined magnitude is input to a microphone by a user associated with the user object 21 (a speaking state). Here, it may be determined whether a state is a speaking state or not, for example, on the basis of whether or not a predetermined time (for example, the number of seconds set in advance) has elapsed from when a voice having a volume equal to or higher than a predetermined magnitude was previously input. In other words, the line-of-sight control unit 14 determines a non-speaking state in a case in which a predetermined time has elapsed from when a voice having a volume equal to or higher than a predetermined magnitude was previously input and determines a speaking state in a case in which a predetermined time has not elapsed from when a voice having a volume that is equal to or higher than a predetermined magnitude was previously input. However, the method of determining whether a state is a speaking state or not is not limited to the method described above. For example, a speaking user (or a user who intends to begin speaking) may switch his or her status to a speaking state in accordance with an explicit operation of a controller or the like not illustrated in the drawing. In such a case, the line-of-sight control unit 14 can determine whether a state is a speaking state or not on the basis of the status set for each user.

In this embodiment, the following order of priority levels is set as one example. In addition, in this embodiment, the line-of-sight control unit 14 excludes a non-speaking object as a candidate toward which the line-of-sight of the user object 21A is directed. However, the line-of-sight control unit 14 may include a non-speaking object as a candidate toward which the line-of-sight of the user object 21A is directed.

1. Moving object
2. Speaking object
3. Still object
4. Non-speaking object

The line-of-sight control unit 14 performs control such that a candidate object having a high priority level is selected first as a destination toward which the line-of-sight of the user object 21A is directed. One example of such control (see FIG. 4) will be described later. In addition, in a case in which a plurality of candidate objects for which the same priority level is set (in other words, candidate objects of which the types and the states are the same) are present, the line-of-sight control unit 14 may select a candidate object of which the index values (angles θ1 and θ2) described above are the smallest as a destination toward which the line-of-sight of the user object 21A is directed.

In addition, the line-of-sight control unit 14 determines whether or not a user associated with the user object 21A that is speaking and may control the line-of-sight of the user object 21A on the basis of control details set in advance to the user object associated with a user who is speaking (in other words, a speaking object) in a case in which the user is speaking. For example, the line-of-sight of the user object 21A may be controlled on the basis of special control details set in advance such that an appropriate behavior as a speaking person (for example, a presenter or the like) is performed. For example, in a case in which the provisional line-of-sight 31 of the user object 21A is fixed within a predetermined range (for example, the amount of change of the provisional line-of-sight 31 per unit time is within a threshold set in advance), the line-of-sight control unit 14 may employ the provisional line-of-sight 31 of the user object 21A as a line-of-sight after the control of the user object 21A as it is. On the other hand, in a case in which the provisional line-of-sight 31 of the user object 21A changes over the predetermined range (for example, the amount of change of the provisional line-of-sight 31 per unit time exceeds the threshold described above (in a case in which the line-of-sight greatly waves)), the line-of-sight control unit 14 may control the provisional line-of-sight 31 of the user object 21A such that the line-of-sight is sequentially directed toward the user objects 21B and 21C.

The image generating unit 15 generates an image on which the line-of-sight of the user object 21A controlled by the line-of-sight control unit 14 is reflected (an image displayed in each HMD 1). For example, the image generating unit 15 generates an image that is adjusted such that the line-of-sight (the direction of the line-of-sight and/or the viewpoint) of the user object 21A controlled by the line-of-sight control unit 14 coincides with a line-of-sight (the direction of a line-of-sight and/or a viewpoint) identified in accordance with the direction of the face, the eyes (the positions of irises), and the like of the user object 21A displayed in an image in each HMD 1. The image generated by the image generating unit 15 is output to each HMD 1 through the communication unit 11. In According to such processes, the image on which the line-of-sight of the user object 21A controlled by the line-of-sight control unit 14 is reflected is presented to each user through each HMD 1.

Figure 3:
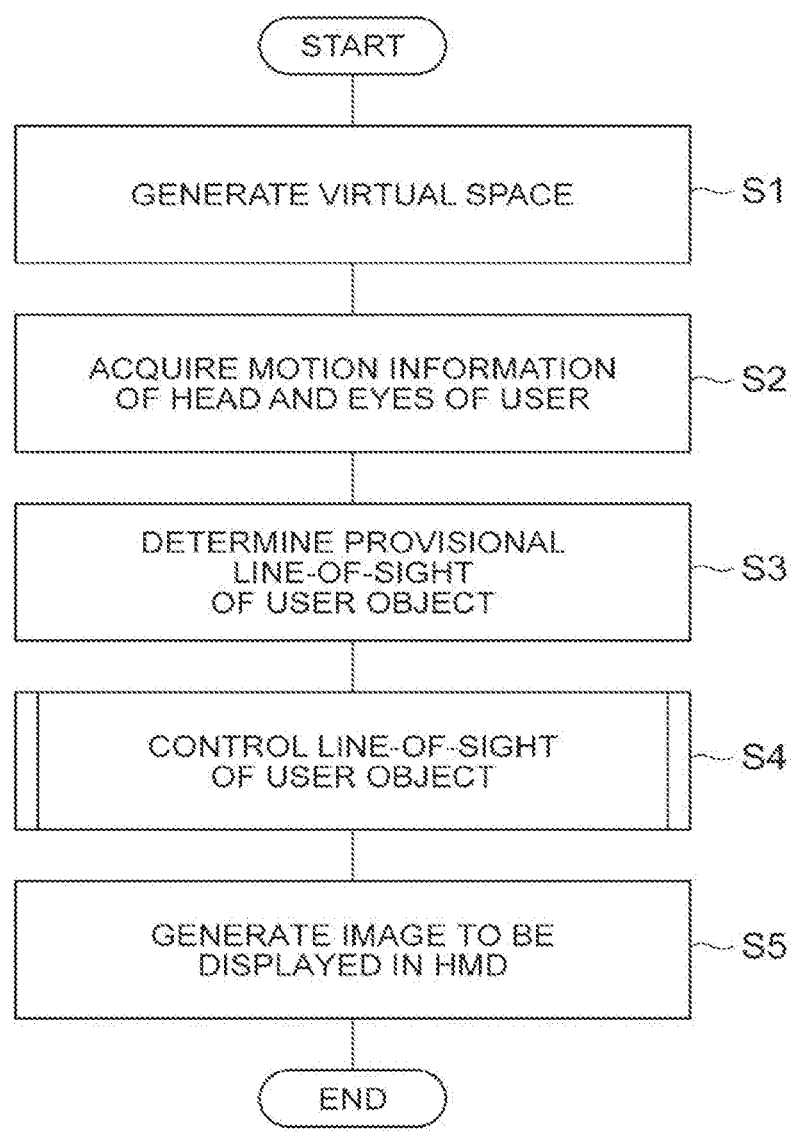
FIG. 3 is a flowchart illustrating one example of a motion of an information processing device.
Figure 4:
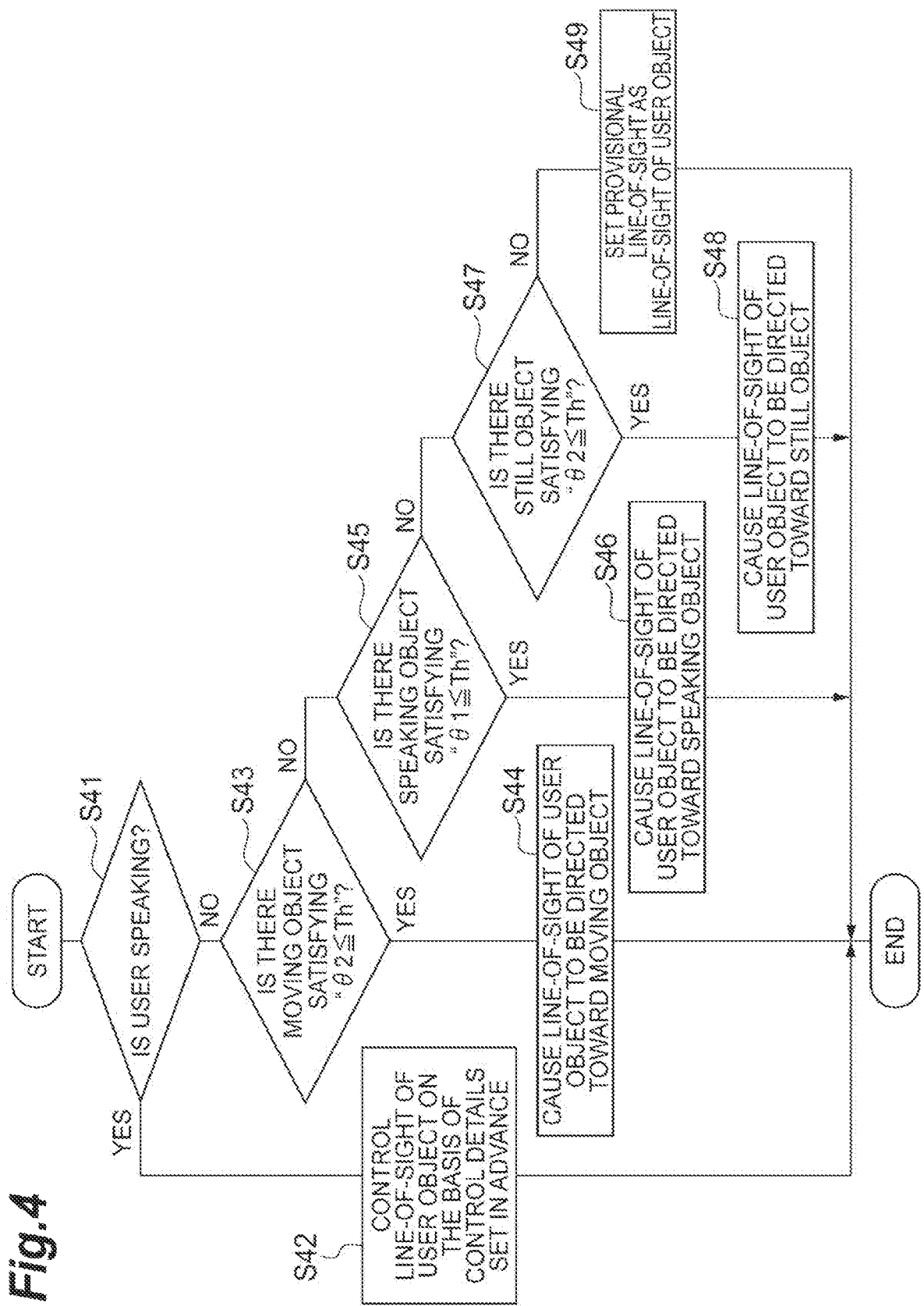
FIG. 4 is a flowchart illustrating one example of the sequence of S4 in the flowchart illustrated in FIG. 3.

Next, one example of the operation of the information processing device 10 will be described with reference to FIGS. 3 to 6. Flowcharts illustrated in FIGS. 3 and 4 illustrate a process by focusing a case in which control of the line-of-sight of the user object 21A illustrated in FIG. 2 is performed. Control of the lines of sights of the user objects 21B and 21C associated with other users is similar to the control of line-of-sight of the user object 21A, and thus description thereof will be omitted.

As illustrated in FIG. 3, first, the information processing device 10 generates a virtual space V (see FIG. 2) shared by a plurality of users (Step S1). More specifically, a virtual space V in which user objects 21 associated with users, material objects 22, and the like are arranged at initial positions is generated. Subsequently, the motion information acquiring unit 12 acquires motion information of the head and eyes of each user received from each HMD 1 through the communication unit 11 (Step S2). Subsequently, the provisional line-of-sight determining unit 13 determines a provisional line-of-sight 31 of a user object 21 (here, the user object 21A) associated with a user on the basis of a motion information of the user acquired by the motion information acquiring unit 12. Subsequently, the line-of-sight control unit 14 controls the line-of-sight of the user object 21A on the basis of a positional relation between the provisional line-of-sight 31 of the user object 21A determined by the provisional line-of-sight determining unit 13 and one or more objects (other user objects 21 and 22) in the virtual space V (Step S4).

One example of a detailed processing sequence of Step S4 will be described with reference to FIG. 4. The processing sequence illustrated in FIG. 4 is one example of a determination sequence in which a candidate object that is a destination toward which the line-of-sight of the user object 21A is directed is selected in accordance with a priority level described above.

As illustrated in FIG. 4, first, the line-of-sight control unit 14 determines whether or not a user associated with the user object 21A that is a processing target is speaking (Step S41).

In a case in which the user is speaking (Step S41: Yes), the line-of-sight control unit 14 controls the line-of-sight of the user object 21A on the basis of the control details set in advance as described above (Step S42). For example, in a case in which the provisional line-of-sight 31 of the user object 21A is fixed within a predetermined range, the line-of-sight control unit 14 employs the provisional line-of-sight 31 of the user object 21A as a line-of-sight of the user object 21A after control as it is. On the other hand, in a case in which the provisional line-of-sight 31 of the user object 21A changes over the predetermined range (in a case in which the provisional line-of-sight greatly waves), the line-of-sight control unit 14 controls the line-of-sight of the user object 21A such that the line-of-sight is sequentially directed toward the user objects 21B and 21C. In accordance with such a process, the line-of-sight of the user object 21A is controlled such that an appropriate behavior as a speaking person is performed.

On the other hand, in a case in which the user is not speaking (Step S41: No), the line-of-sight control unit 14 determines whether or not a moving object for which an angle $\theta 2$ between the provisional line-of-sight 31 and the provisional line-of-sight 33 (a segment joining the start point 31a and the candidate point P of the material object 22) is equal to or smaller than the threshold Th is present (Step S43). In a case in which a moving object satisfying the determination condition described above (candidate object) is present (Step S43: Yes), the line-of-sight control unit 14 directs the line-of-sight of the user object 21 toward the candidate point P of the moving object satisfying the determination condition described above (a moving object of which the angle $\theta 2$ is the smallest in a case in which a plurality of moving objects satisfying the determination condition described above are present). In other words, the line-of-sight control unit 14 sets the line-of-sight of the user object 21 to coincide with a virtual line-of-sight 33 binding the start point 31a and the candidate point P of the moving object.

Figure 5:
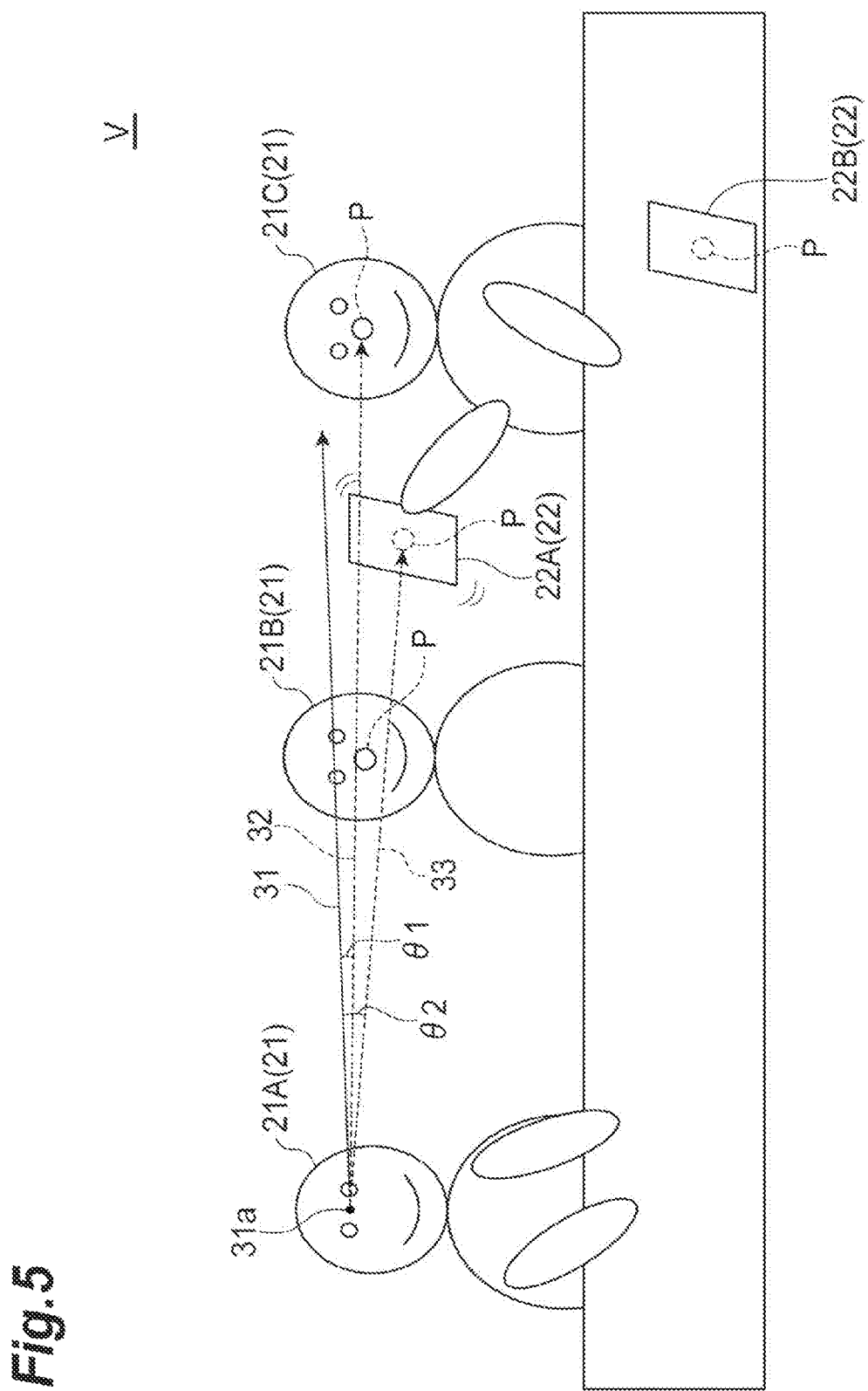
FIG. 5 is a diagram illustrating one example of control of a line-of-sight of a user object.

FIG. 5 illustrates a state in which a material object 22A is held by a user object 21C, and the material object 22A is moving in accordance with a motion of a hand of the user object 21C. In this case, the material object 22A is determined as a moving object. In this example, in a case in which the angle $\theta 2$ between the provisional line-of-sight 31 and the virtual line-of-sight 33 (a segment joining the start point 31a and the candidate point P of the material object 22A) is equal to or smaller than the threshold Th, the material object 22A satisfies the determination condition of Step S43. In the case, the line-of-sight control unit 14 sets the line-of-sight of the user object 21 to coincide with the virtual line-of-sight 33 described above.

On the other hand, in a case in which a moving object satisfying "$\theta 2 \leq Th$" is not present (Step S43: No), the line-of-sight control unit 14 determines whether or not a speaking object for which an angle $\theta 1$ formed by the provisional line-of-sight 31 and the virtual line-of-sight 32 (a segment joining the start point 31a and the candidate point P of the user object 21) is equal to or smaller than the threshold Th is present (Step S45). In a case in which a speaking object (candidate object) satisfying the determination condition described above is present (Step S45: Yes), the line-of-sight control unit 14 directs the line-of-sight of the user object 21 toward the candidate point P of the speaking object satisfying the determination condition described above (a speaking object of which the angle $\theta 1$ is the smallest in a case in which a plurality of speaking objects satisfying the determination condition described above are present). In other words, the line-of-sight control unit 14 causes the line-of-sight of the user object 21 to coincide with the virtual line-of-sight 32 joining the start point 31a and the candidate point P of the speaking object.

Figure 6:
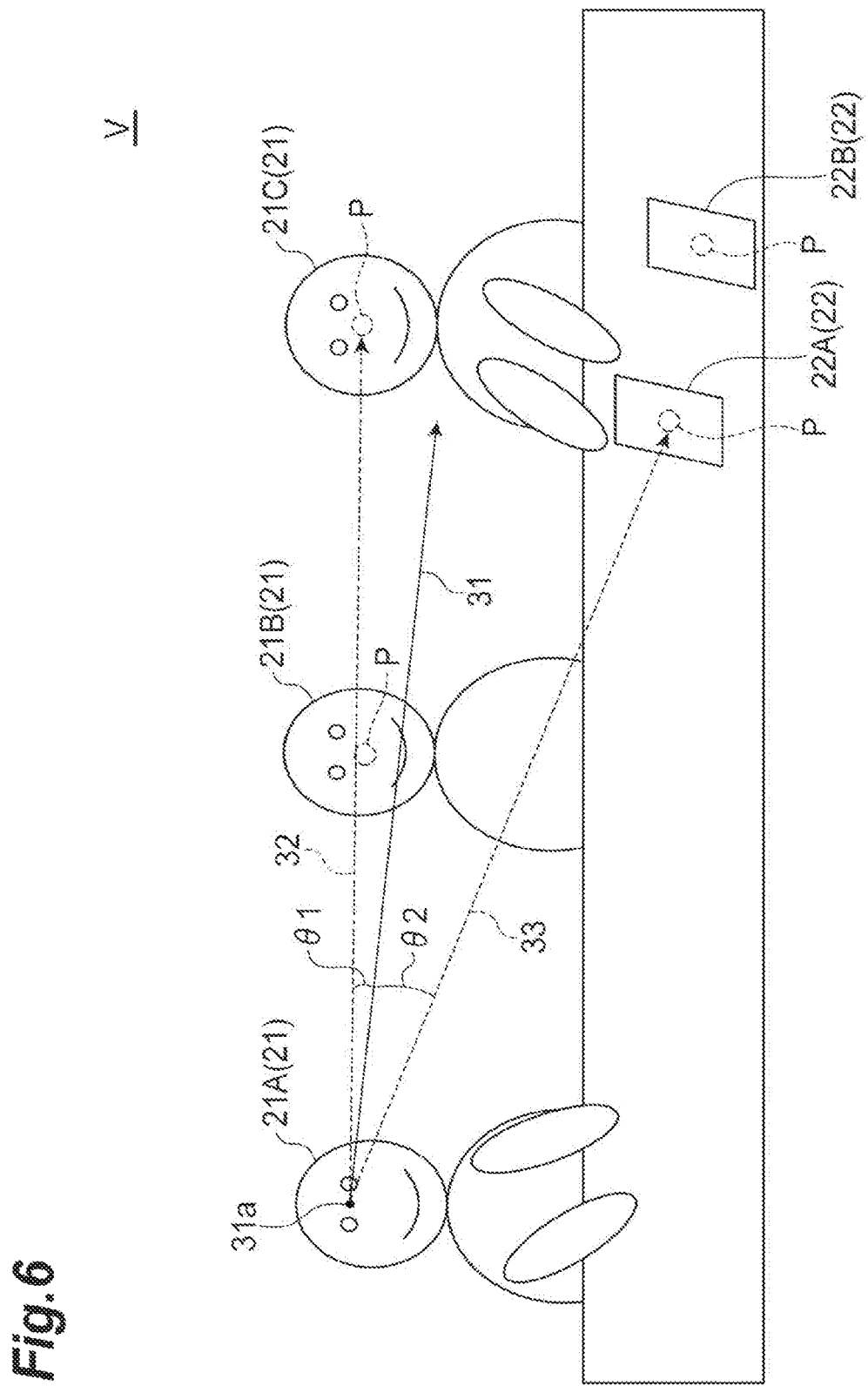
FIG. 6 is a diagram illustrating one example of control of a line-of-sight of a user object.

FIG. 6 illustrates a state in which a user object 21B is a non-speaking object, and a user object 21C is a speaking object. In this example, in a case in which the angle $\theta 1$ formed by the provisional line-of-sight 31 and the virtual line-of-sight 32 (a segment joining the start point 31a and the candidate point P of the user object 21C) is equal to or smaller than the threshold Th, the user object 21C satisfies the determination condition of Step S45. Accordingly, in this case, the line-of-sight control unit 14 causes the line-of-sight of the user object 21 to coincide with the virtual line-of-sight 32 described above.

On the other hand, in a case in which a speaking object satisfying "$\theta 1 \leq Th$" is not present (Step S45: No), the line-of-sight control unit 14 determines whether or not a still object for which an angle $\theta 2$ formed by the provisional line-of-sight 31 and the virtual line-of-sight 33 (a segment joining the start point 31a and the candidate point P of the material object 22) is equal to or smaller than the threshold Th is present (Step S47). In a case in which a still object satisfying the determination condition described above is present (Step S47: Yes), the line-of-sight control unit 14 directs the line-of-sight of the user object 21 toward the candidate point P of the still object satisfying the determination condition (a still object of which the angle $\theta 2$ is the smallest in a case in which a plurality of still objects satisfying the determination condition described above are present).

In FIG. 2 described above, the material object 22A is a still object. In this example, in a case in which the angle $\theta 2$ formed by the provisional line of light 31 and the virtual line-of-sight 33 (a segment joining the start point 31a and the candidate point P of the material object 22A) is equal to or smaller than the threshold Th, the material object 22A satisfies the determination condition of Step S47. Accordingly, in this case, the line-of-sight control unit 14 causes the line-of-sight of the user object 21 to coincide with the virtual line-of-sight 33 described above. In addition, in the example illustrated in FIG. 2, there is also a possibility that an angle (hereinafter, referred to as an angle "A") formed by a segment joining the start point 31a and the candidate point P of the material object 22B and the provisional line-of-sight 31 is equal to or smaller than the threshold Th. However, also in this case, since the angle $\theta 2$ is smaller than the angle A, the line-of-sight control unit 14 selects the material object 22A as a destination toward which the line-of-sight of the user object 21 is directed.

On the other hand, in a case in which a still object satisfying "$\theta 2 \leq Th$" is not present (Step S47: No), the line-of-sight control unit 14 sets the provisional line-of-sight 31 as the line-of-sight of the user object 21A (Step S49). In other words the line-of-sight control unit 14 causes the line-of-sight of the user object 21A to coincide with the provisional line-of-sight 31.

Subsequently, referring back to FIG. 3, the image generating unit 15 generates an image on which the line-of-sight of the user object 21A controlled by the line-of-sight control unit 14 is reflected (an image display in each HMD 1) (Step S5). An image for each user generated by the image generating unit 15 (in other words, an image according to the visual field of the user object 21 associated with each user), for example, is transmitted to each HMD 1 through the communication unit 11 and is displayed in each HMD 1. Accordingly, each user recognizes the line-of-sight of the user object 21A controlled by the line-of-sight control unit 14 through the image displayed in the HMD 1.

According to the information processing device 10 described above, the provisional line-of-sight 31 of the user object 21A is determined once on the basis of the motion information of the head and eyes of the user that have been actually detected. Then, on the basis of a positional relation between the provisional line-of-sight 31 and one or more objects (in this embodiment, another user object 21 and the material object 22) in the virtual space V, the line-of-sight of the user object 21A is controlled, and an image displayed in the HMD 1 is generated. According to such a process, the line-of-sight of the user object 21A controlled to be directed toward a more natural direction than that in a case in which the line-of-sight (motion information) of the user that has been actually detected is applied to the line-of-sight of the user object 21A as it is can be presented to users (in this embodiment, users associated with the user objects 21A to 21C). As a result, communication among users in the virtual space V through the user object 21A can be performed further smoothly.

In addition, the light of sight control unit 14 calculates an index value (in this embodiment, the angles θ1 and θ2) representing a distance between the provisional line-of-sight 31 and an object, compares the index value with a predetermined threshold Th and, in a case in which a candidate object that is an object of which the index value is equal to or smaller than the threshold Th is present, controls the line-of-sight of the user object 21 such that it is directed toward the candidate object. According to the configuration described above, the line-of-sight of the user object 21 is controlled such that it is directed toward a candidate object for which a distance between the provisional line-of-sight 31 and the object is closer than a predetermined reference. According to this process, the line-of-sight of the user object 21A can be fixed such that it is directed toward an object (candidate object) that is estimated to have a high likelihood of attracting the attention of the user associated with the user object 21. For this reason, a deviation of the line-of-sight of the user object 21 (a deviation based on detection error of the motion of the head or eyes of the user), waving of the line-of-sight of the user object 21, and the like occurring in a case in which the line-of-sight of the user (motion information) that has been actually detected is applied to the line-of-sight of the user object 21 as it is can be inhibited. As a result, a more natural and smooth line-of-sight of the user object 21 can be expressed in an image (video) generated by the image generating unit 15, and communication among users through the user object 21 can be smoothly performed.

As supplementary description, in a case in which a user sees in the direction of a certain object (for example, a speaking object), detection error may occur in the motion information of the hear part or the eyes of the user detected by a sensor or the like mounted in the HMD 1. In such a case, in a case in which a line-of-sight based on the motion information described above (in other words, the provisional line-of-sight 31) is applied as the line-of-sight of a user object 21 associated with the user as it is, the detection error described above has a direct influence also on the line-of-sight of the user object 21. In other words, error corresponding to the detection error described above occurs in the line-of-sight of the user object 21, and accordingly, the line-of-sight of the user object 21 deviates from a direction toward the speaking object. On the other hand, according to the process of the information processing device 10 (particularly, the line-of-sight control unit 14), such detection error is absorbed, and the line-of-sight of the user object 21 can be controlled to be directed toward an object assumed to have a high likelihood of attracting a user (in this example, the speaking object described above).

In addition, in order to display a user object 21 associated with another user (second user) in a visual field image provided for a certain user (first user) through the HMD 1, it is necessary for the information processing device 10 generating the visual field image to receive motion information of the second user and control the motion of the user object 21 associated with the second user on the basis of the motion information. Here, in a case in which there is a delay (a communication delay, a processing delay, or the like) in reception of the motion information of the second user or the control, there is concern that there is a time difference between the actual motion of the second user and the motion of the user object 21 associated with the second user. In addition, there is also concern that a video having a sense of incongruity in which the direction of the face, the line-of-sight, and the like of the user object 21 discontinuously change (suddenly change greatly) in accordance with an omission of a part of the process due to the delay is provided for the first user. On the other hand, according to the process of the information processing device 10 (the line-of-sight control unit 14), even in a case in which the actual line-of-sight of the user (in other words, the provisional line-of-sight 31) slightly waves, the line-of-sight of the user object 21 can be fixed in the direction toward the candidate object. According to such a process, a deviation of the line-of-sight of the user object 21 is inhibited, and it can be inhibited to give a feeling of anxiety to a counterpart user. As a result, communication between users can be smoothly performed. In addition, according to the above-described control of the information processing device 10, it is not necessary to completely associate the motion of the head or eyes of the second user and the motion (the line-of-sight) of the user object 21 associated with the second user with each other. In other words, according to the control of the information processing device 10, unless the line-of-sight (the provisional line-of-sight 31) of the second user greatly deviates from the candidate object, the line-of-sight of the user object 21 can be fixed in the direction toward the candidate object. During that period, it is not necessary to reflect an actual motion of the head or eyes of the second user on the motion (the line-of-sight) of the user object 21. Accordingly, the processing load and the amount of use of hardware resources such as a processor, a memory, and the like can be effectively reduced.

In addition, in this embodiment, although the angles θ1 and θ2 formed by the provisional line-of-sight 31 and the virtual lines of sights 32 and 33 are used as index values, the index values may be any other values. For example, the line-of-sight control unit 14 may perform the determination described above by using only the horizontal component (the angle $θ1_h$) or the vertical component (the angle $θ1_v$) of the angle θ1 instead of the angle θ1. In other words, the line-of-sight control unit 14 may extract candidate objects by comparing the horizontal component (the angle $θ1_h$) or the vertical component (the angle $θ1_v$) of the angle θ1 with a predetermined threshold instead of comparing the angle θ1 with the threshold Th as described above. Similarly, the line-of-sight control unit 14 may perform the determination described above by using only the horizontal component (the angle $θ2_h$) or the vertical component (the angle $θ2_v$) of the angle θ2 instead of the angle θ2. In other words, the line-of-sight control unit 14 may extract candidate objects by comparing the horizontal component (the angle $θ2_h$) or the vertical component (the angle $θ2_v$) of the angle θ2 with a predetermined threshold instead of comparing the angle θ2 with the threshold Th as described above. In addition, in a case in which the provisional line-of-sight determining unit 13 determines a provisional line-of-sight including not only the direction of the line-of-sight of the user but also the viewpoint (gazing point) on the basis of the motion information of the head and eyes of the user described above, a distance between the viewpoint and the object (the candidate point P set in the object) (for example, a linear distance in the virtual space V) may be used as an index value.

In addition, in a case in which there are a plurality of candidate objects, the line-of-sight control unit 14 selects one candidate object on the basis of at least one of the type and the state of each candidate object and controls the line-of-sight of the user object 21 such that it is directed toward the one candidate object. According to the configuration described above, in a case in which there are a plurality of candidate objects, a candidate object that is a destination toward which the line-of-sight of the user object 21 is directed can be appropriately determined on the basis of at least one of the type and the state of the candidate object.

In addition, a priority level higher than that of a still object (a material object 22 representing an object not moving in the virtual space V) is set to a moving object (a material object 22 representing a moving object in the virtual space V), and, in a case in which a plurality of candidate objects are present, the line-of-sight control unit 14 determines a candidate object that is a destination toward which the line-of-sight of the user object 21 is directed on the basis of the priority level and controls the line-of-sight of the user object 21 such that it is directed toward the determined candidate object. According to the configuration described above, on the basis of knowledge of the inventors indicating that a moving object has a higher likelihood of attracting the eyes of a user than a still object, the line-of-sight of the user object 21 can be controlled such that it is directed toward an object having a high likelihood of attracting user's attention. In addition, in a case in which there are a plurality of candidate objects to which the same priority level is set (in other words, candidate objects having the same type and the same state of the objects), for example, the line-of-sight control unit 14 may select a candidate object having the smallest index values (the angles θ1 and θ2) described above among the plurality of candidate objects as a destination toward which the line-of-sight of the user object 21 is directed. In a case in which one candidate object is not determined even in accordance with the process described above, the line-of-sight control unit 14, for example, may determine one candidate object on the basis of an arbitrary index such as a sequence in which the comparison process is performed or the like. According to such a process, a candidate object that is a destination toward which the line-of-sight of the user object 21 is directed can be appropriately determined.

In addition, a priority level higher than that of an object associated with a non-speaking user (a user object 21 associated with a user who is not speaking) is set to a speaking object (a user object 21 associated with a user who is speaking). According to the configuration described above, on the basis of knowledge of the inventors indicating that a speaking object has a higher likelihood of attracting the eyes of a user than a non-speaking object, the line-of-sight of the user object 21 can be controlled such that it is directed toward an object having a high likelihood of attracting user's attention.

In addition, the block diagram (FIG. 1) used in the description of the embodiment described above illustrates blocks in units of functions. Such a functional block (constituent unit) is realized by an arbitrary combination of hardware and/or software. In addition, a means for realizing each functional block is not particularly limited. In other words, each functional block may be realized by one device that is physically and/or logically combined or may be realized by a plurality of devices by connecting directly and/or indirectly (for example, using wired connection and/or wireless connection) two or more device that are physically and/or logically separate.

Figure 9:
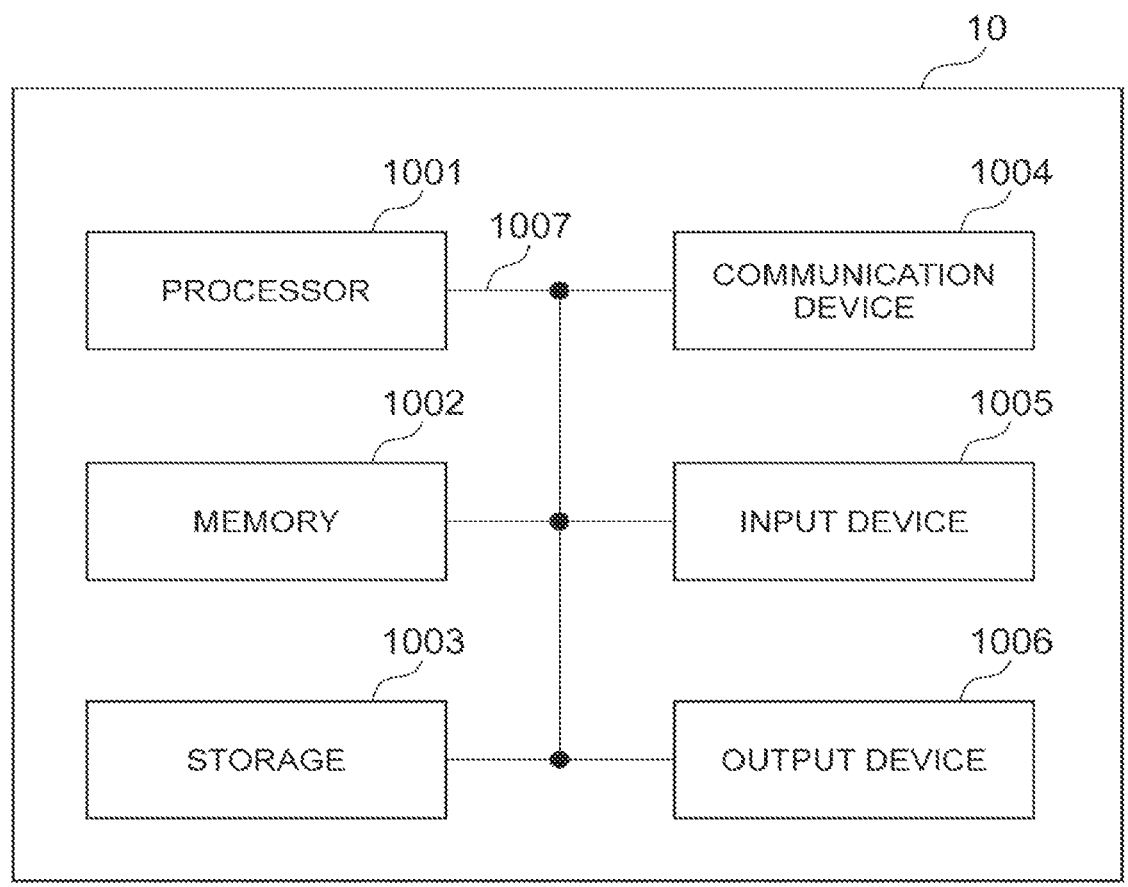
FIG. 9 is a block diagram illustrating one example of the hardware configuration of an information processing device.

For example, the information processing device 10 according to the embodiment described above may function as a computer performing the process of the information processing device 10 according to the embodiment described above. FIG. 9 is a diagram illustrating one example of the hardware configuration of the information processing device 10 according to this embodiment. The information processing device 10 described above may be physically configured as a computer apparatus including a processor 1001, a memory 1002, a storage 1003, a communication device 1004, an input device 1005, an output device 1006, a bus 1007, and the like.

In addition, in the following description, the term "a device" may be rephrased as a circuit, a device, a unit, or the like. The hardware configuration of the information processing device 10 may be configured to include one or a plurality of devices illustrated in FIG. 9 or may be configured not to include some devices.

Each function of the information processing device 10 is realized by causing the processor 1001 to perform an arithmetic operation by causing predetermined software (program) to be read on hardware such as the processor 1001 and the memory 1002 and controlling communication using the communication device 1004 and data reading and/or writing for the memory 1002 and the storage 1003.

The processor 1001, for example, controls the entire computer by operating an operating system. The processor 1001 may be configured using a central processing unit (CPU) including an interface for peripheral devices, a control device, an arithmetic operation device, a register, and the like.

In addition, the processor 1001 may read a program (program code), a software module and/or data from the storage 1003 and/or the communication device 1004 into the memory 1002 and executes various processes in accordance therewith. As the program, a program causing a computer to execute at least some of the operations described in the embodiment described above is used. For example, the line-of-sight control unit 14 of the information processing device 10 may be realized by a control program that is stored in the memory 1002 and is operated by the processor 1001, and the other functional blocks illustrated in FIG. 1 may be similarly realized. While various processes described above have been described as being executed by one processor 1001, the processes may be executed by two or more processors 1001 simultaneously or sequentially. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable to perform the information processing method according to the embodiment described above (for example, the sequences illustrated in the flowcharts of FIGS. 3 and 4).

The storage 1003 is a computer-readable recording medium and, for example, may be configured by at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or storage 1003, a server, or any other appropriate medium.

The communication device 1004 is hardware (a transmission/reception device) for performing inter-computer communication through a wired and/or wireless network and, for example, may also be called as a network device, a network controller, a network card, a communication module, or the like.

The input device 1005 is an input device (for example, a keyboard, a mouse, a microphone, a switch, a button, a sensor, or the like) accepting an input from the outside. The output device 1006 is an output device (for example, a display, a speaker, an LED lamp, or the like) performing output to the outside. In addition, the input device 1005 and the output device 1006 may have an integrated configuration (for example, a touch panel).

In addition, devices such as the processor 1001, the memory 1002, and the like are interconnected through a bus 1007 for communication of information. The bus 1007 may be configured as a single bus or may be configured using buses different for devices.

In addition, the information processing device 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by hardware. For example, the processor 1001 may be realized using at least one of such hardware components.

As above, while the present invention has been described in detail, it is apparent to a person skilled in the art that the present invention is not limited to the embodiments described in this specification. The present invention may be modified or changed without departing from the concept and the scope of the present invention set in accordance with the claims. Thus, the description presented in this specification is for the purpose of exemplary description and does not have any limited meaning for the present invention.

Modified Example 1

Figure 7:
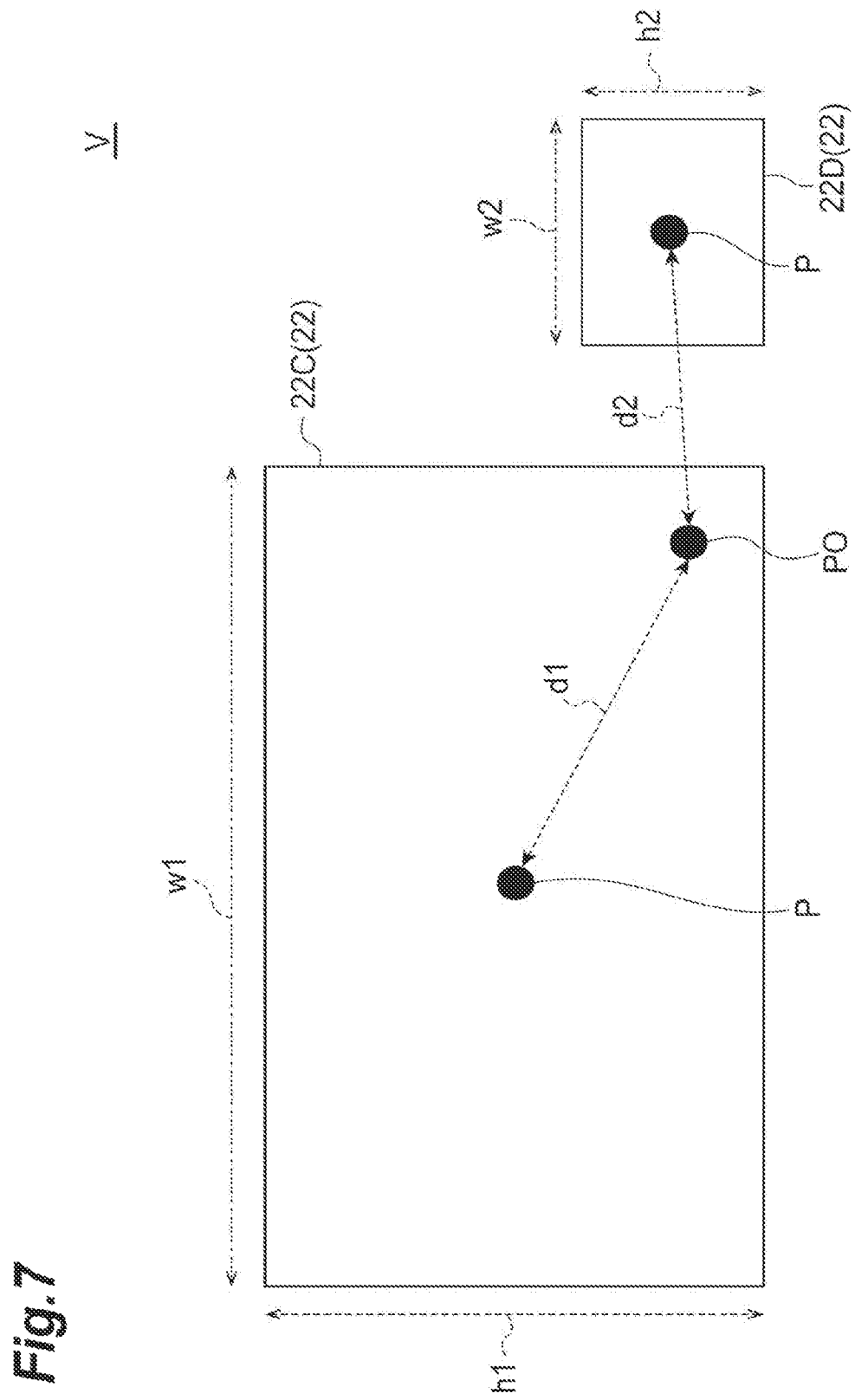
FIG. 7 is a diagram illustrating one example of control of a line-of-sight of a user object.

For example, the line-of-sight control unit 14 may adjust index values or the threshold on the basis of the size of the object. FIG. 7 illustrates a state in which a material object 22C having a rectangular shape having a width w1 and a height h1 and a material object 22D having a rectangular shape having a width w2 (<w1) and a height h2 (<h1) are adjacent to each other in a virtual space V. In addition, FIG. 7 schematically illustrates an image (visual field) of the virtual space V seen from a user object 21 that is a target for controlling the line-of-sight. Here, candidate points P are set at the center points of the material objects 22C and 22D. In addition, in this example, the provisional line-of-sight 31 of the user object 21 described above include information representing a viewpoint (gazing point) P0, and the line-of-sight control unit 14 uses distances d1 and d2 between the viewpoint P0 and the candidate points P of the objects as the index values described in the embodiment described above.

In a case in which "d1>Th" and "d2<Th" are satisfied for the distance d1 between the viewpoint P0 and candidate point P of the material object 22C and the distance d2 between the viewpoint P0 and the candidate point P of the material object 22D, the material object 22D is determined as a candidate object for a destination toward which the line-of-sight of the user object 21 is directed. In addition, also in a case in which "d1<Th" and "d2<Th" are satisfied, since "d1>d2," the material object 22D is determined as a candidate object for a destination toward which the line-of-sight of the user object 21 is directed. However, as illustrated in FIG. 7, the viewpoint P0 of the user object 21 is actually positioned at an edge portion of the material object 22C. In other words, there is a high likelihood that a user corresponding to the user object 21 is watching not the material object 22D but the material object 22C.

Thus, in such a case, for example, the line-of-sight control unit 14 may adjust the distances d1 and d2 that are index values as below such that the material object 22C is appropriately determined as a candidate object for a destination toward which the line-of-sight of the user object 21 is directed. In other words, the line-of-sight control unit 14, for example, calculates index values $d1_{new}$ and $d2_{new}$ that are adjusted as below on the basis of the sizes of the material objects 22C and 22D (here, radiuses (halves of the lengths of diagonal lines) of the material objects 22C and 22D using (Equation 1) and (Equation 2) represented below.

$$d1_{new} = d1 - \sqrt{(w1^2 + h1^2)}/2 \qquad \text{(Equation 1)}$$

$$d2_{new} = d2 - \sqrt{(w2^2 + h2^2)}/2 \qquad \text{(Equation 2)}$$

By using the index value $d1_{new}$ adjusted in this way, the possibility of satisfying "$d1_{new}$<Th" becomes high. In addition, the radius "$\sqrt{(w1^2+h1^2)}/2$" of the material object 22C is larger than the radius "$\sqrt{(w2^2+h2^2)}/2$" of the material object 22D described above, and "$d1_{new}<d2_{new}$" is satisfied. Accordingly, even in a case in which "$d1_{new}$<Th" and "$d2_{new}$<Th" are satisfied, the material object 22C is determined with priority over the material object 22D as a candidate object for a destination toward which the line-of-sight of the user object 21 is directed.

In addition, in the example described above, not the index values d1 and d2 but the threshold may be individually adjusted for the material objects 22C and 22D. For example, the line-of-sight control unit 14 may compare the index value d1 of the material object 22C with not the threshold Th but a threshold Th1 calculated using the following (Equation 3). Similarly, the line-of-sight control unit 14 may compare the index value d2 of the material object 22D with not the threshold Th but a threshold Th2 calculated using the following (Equation 4).

$$Th1 = Th + \sqrt{(w1^2 + h1^2)}/2 \qquad \text{(Equation 3)}$$

$$Th2 = Th + \sqrt{(w2^2 + h2^2)}/2 \qquad \text{(Equation 4)}$$

By using the thresholds Th1 and Th2 adjusted in this way, as the size (here, the radius described) of the material object 22 increases, the determination condition becomes moderate. In other words, as the size of the material object 22 increases, the possibility of satisfying the condition to be extracted as a candidate object ("d1≤Th1" or "d2≤Th2") becomes high. In addition, in a case in which both "d1≤Th1" and "d2≤Th2" are satisfied, the line-of-sight control unit 14, for example, may determine a candidate object that is a destination toward which the line-of-sight of the user object 21 is directed by comparing "d1−Th1" and "d2−Th2." More specifically, the line-of-sight control unit 14 may determine the material object 22C as a candidate object that is a destination toward which the line-of-sight of the user object 21 is directed in the case of "d1−Th1<d2−Th2" and determine the material object 22D as a candidate object that is a destination toward which the line-of-sight of the user object 21 is directed in the case of "d1−Th1>d2−Th2." In this way, a control result that is similar to that of a case in which the index values $d1_{new}$ and $d2_{new}$ are used is acquired.

According to Modified example 1, the index values (here, the distance d1 and d2) or the threshold Th is adjusted with the size of an object (here, the material object 22) taken into account, and a candidate object can be determined on the basis of the index values or the threshold after adjustment. As a result, the line-of-sight of the user object 21 can be controlled such that it is directed toward a more appropriate object (candidate point P).

In addition, instead of performing adjustment of the index values or the threshold as described above, candidate points P corresponding to the sizes of an object may be set for each object (the material object 22) in advance. For example, in a case in which candidate points P are set at constant intervals, as the size of the material object 22 increases, more candidate points P are set. As a result, the above-described problem occurring in a case in which the candidate point P is set only at the center point of the material object 22 as in the example illustrated in FIG. 7 can be avoided. However, since comparison is required for each candidate point P in the process of the line-of-sight control unit 14, and accordingly, in a case in which the number of candidate points is increased, the number of times of comparison increases. On the other hand, in a case in which adjustment of the index values or the threshold as described above is performed, the number of candidate objects can be appropriately determined while the amount of processing required for the line-of-sight control unit 14 is inhibited by decreasing the number of candidate points P as possibly as can.

Modified Example 2

In addition, in a case in which a candidate object determined as a destination toward which the line-of-sight of the user object 21 is directed is a moving object, the line-of-sight control unit 14 may determine whether or not the line-of-sight of the user object 21 is directed toward the candidate object on the basis of the moving form of the candidate object. For example, in the case of a moving form in which a candidate object that is a moving object moves a predetermined distance or more per unit time (for example, in the case of moving a predetermined threshold distance at a predetermined threshold speed or more), the line-of-sight (the provisional line-of-sight 31) acquired from the user's motion information and the line-of-sight after adjustment (the line-of-sight toward the candidate object) greatly deviate from each other instantly. In addition, the actual line-of-sight of a user hardly completely follows (or cannot follow) the movement of an object moving at a very high speed.

Thus, in a case in which the moving form of a candidate object satisfies the condition as described above, the line-of-sight control unit 14 may not cause the line-of-sight of the user object 21 to be directed toward the candidate object. In other words, the line-of-sight control unit 14 may not cause the line-of-sight of the user object 21 to follow the candidate object. In such a case, the line-of-sight control unit 14, for example, may derive a moving range of a nearest candidate object from the position of a candidate object in a predetermined period in the past and fix the viewpoint of the user object 21 at the center point of the moving range.

According to Modified example 2, it can be inhibited that the line-of-sight of a user object 21 becomes unnatural (in the example described above, a line-of-sight completely follows a candidate object moving at a high speed) on the basis of the moving form of the candidate object.

Modified Example 3

Figure 8:
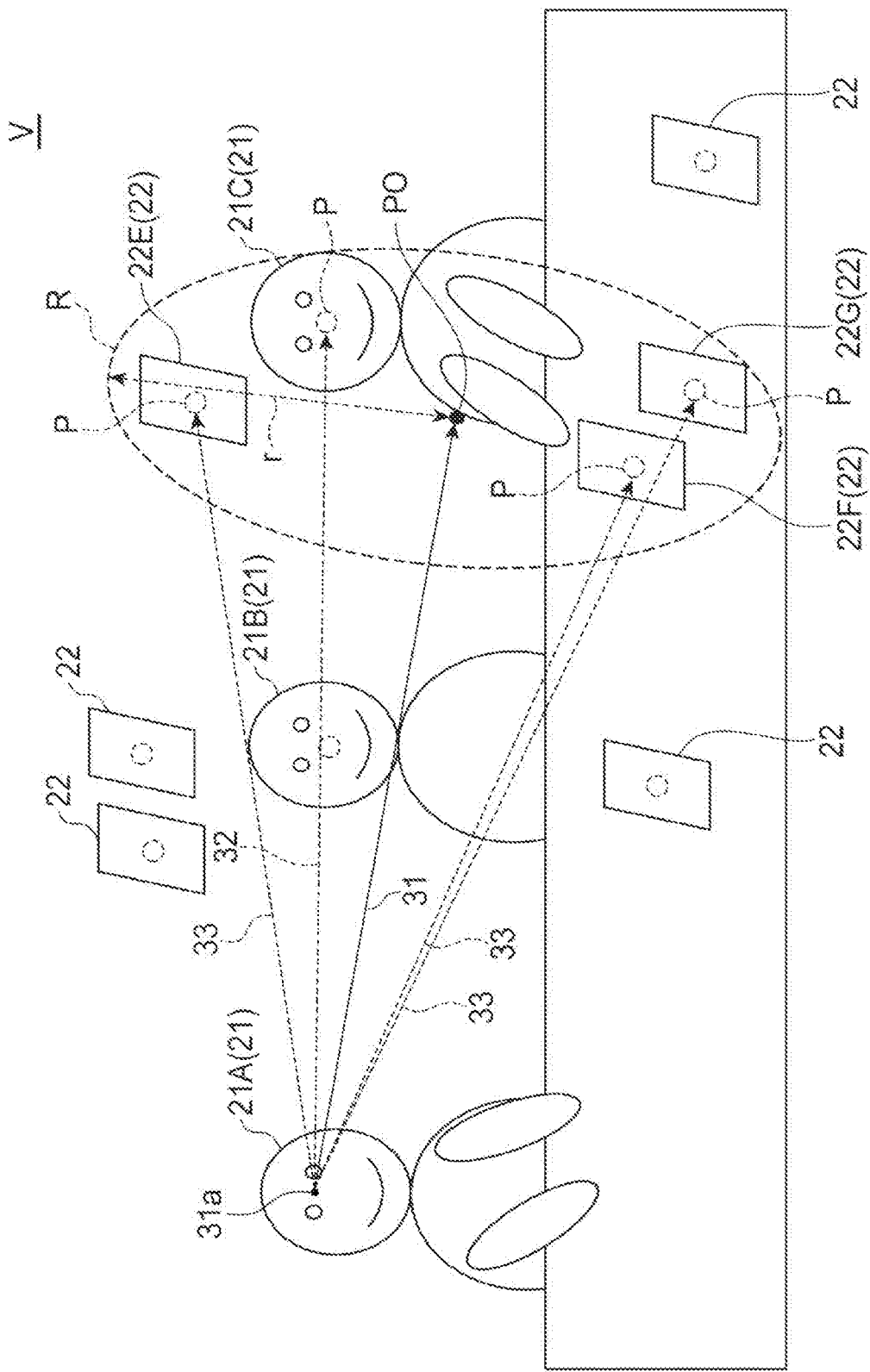
FIG. 8 is a diagram illustrating one example of an object extraction range determined on the basis of a provisional line-of-sight.

In addition, the line-of-sight control unit 14 may determine a range configuring a part of the virtual space V on the basis of a provisional line-of-sight 31, extract an object included in the range, and control the line-of-sight of the user object 21 on the basis of a positional relation between the provisional line-of-sight 31 and the extracted object. FIG. 8 illustrates one example of an extraction range of objects determined on the basis of a provisional line-of-sight 31. In the example illustrated in FIG. 8, the line-of-sight control unit 14 determines a sphere-shaped area having a radius r from a viewpoint P0 of the provisional line-of-sight 31 as the range R described above. In this example, a user object 21C and material objects 22E, 22F, and 22G (candidate points P thereof) included in the range R are extracted as candidates for a destination toward which the line-of-sight of the user object 21 is directed. Thus, the other objects are excluded from candidates for a destination toward which the line-of-sight of the user object 21 is directed, and the process of comparison with the threshold and the like described above is not performed for the other objects.

According to Modified example 3, in a case in which there are a plurality of objects in a virtual space V, objects that are calculation targets (candidates for a destination toward which the line-of-sight of the user object 21 is directed) are narrowed down, and accordingly the amount of calculation performed by the line-of-sight control unit 14 can be inhibited. As a result, high-speed processing, a decrease in the amount of used memory, and the like can be achieved. In addition, the range R described above is one example, and, for example, in a case in which a speaking object is present at the tip of the viewpoint P0 of the provisional line-of-sight 31, a spherical area having a radius r which has the candidate point P of the speaking object as its center or the like may be used instead of the range R described above.

The processing sequence, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution.

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among other various technologies. For example, data, an instruction, a command, information, a signal, a bit, a symbol, a chip, and the like described over the entire description presented above may be represented using a voltage, a current, radio-waves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto.

In addition, information, a parameter, and the like described in this specification may be represented using absolute values, relative values from predetermined values, or other corresponding information.

A name used for each parameter described above is not limited in any aspect. In addition, numerical equations using such parameters may be different from those that are explicitly disclosed in this specification.

Description of "on the basis of" used in this specification does not mean "only on the basis of" unless otherwise mentioned. In other words, description of "on the basis of" means both "only on the basis of" and "at least on the basis of."

As long as "include," "including," and modifications thereof are used in this specification or the claims, such terms are intended to be inclusive like a term "comprising." In addition, a term "or" used in this specification or the claims is intended to be not an exclusive logical sum.

Other than a case in which clearly only one device is present in a context or technically, a device includes a plurality of devices.

Terms such as "determining" used in this specification may include various operations of various types. The "determining," for example, may include a case in which judging, calculating, computing, processing, deriving, investigating, looking up (for example, looking up a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining."

In the entirety of the present disclosure, unless a singularity is represented clearly from the context, it includes a plurality thereof.

REFERENCE SIGNS LIST

1 HMD (display device)
10 information processing device
12 motion information acquiring unit
13 provisional line-of-sight determining unit
14 line-of-sight control unit
15 image generating unit
21, 21A, 21B, 21C user object
22, 22A, 22B, 22C, 22D, 22E, 22F, 22G material object
31 provisional line-of-sight
θ1,θ2 angle (index value)
V virtual space

The invention claimed is:

1. An information processing device that controls an operation of each user object in a virtual space that is associated with each of a plurality of users wearing a display device, the information processing device comprising:
  processing circuitry configured to
    acquire motion information of the head and eyes of a first user detected in an actual space;
    determine a provisional line-of-sight of a first user object associated with the first user on the basis of the motion information of the head and eyes of the first user;
    control a line-of-sight of the first user object on the basis of a positional relation between the provisional line-of-sight and one or more candidate objects in the virtual space; and
    generate, as an image to be displayed on the display device worn by a second user different from the first user, an image corresponding to a field of view of a second user object associated with the second user and including the first user object to which the line-of-sight controlled by the processing circuitry is reflected,
  wherein, in a case in which a plurality of the candidate objects are present, the processing circuitry selects one of the candidate objects on the basis of at least one of a type and a state of each of the candidate objects and controls the line-of-sight of the first user object such that it is directed toward the one of the candidate objects,
  wherein a priority level higher than that of an object representing an object not moving in the virtual space is set for an object representing a speaking object in the virtual space, and
  wherein a priority level higher than that of a speaking object is set for a moving object in the virtual space.

2. The information processing device according to claim 1, wherein the processing circuitry calculates an index value representing a distance between the provisional line-of-sight and the one or more objects, compares the index value with a predetermined threshold, and controls the line-of-sight of the first user object such that it is directed toward a candidate object that is the object of which the index value is equal to or smaller than the threshold in a case in which the candidate object is present.

3. The information processing device according to claim 2, wherein the processing circuitry adjusts the index value or the threshold on the basis of a magnitude of the object.

4. The information processing device according to claim 2, wherein, in a case in which the candidate object is an object moving in the virtual space, the processing circuitry determines whether or not the line-of-sight of the first user object is directed toward the candidate object on the basis of a moving form of the candidate object.

5. The information processing device according to claim 1,
   wherein a priority level higher than that of an object associated with a non-speaking user is set for an object associated with a speaking user.

6. The information processing device according to claim 1, wherein the processing circuitry determines whether or not the first user associated with the first user object is speaking and controls the line-of-sight of the first user object on the basis of control details set in advance for a user object associated with the speaking user in a case in which the user is speaking.

7. The information processing device according to claim 1, wherein the processing circuitry determines a range configuring a part of the virtual space on the basis of the provisional line-of-sight, extracts an object included in the range, and controls the line-of-sight of the first user object on the basis of a positional relation between the provisional line-of-sight and the extracted object.

\* \* \* \* \*